(12) United States Patent
Breunig et al.

(10) Patent No.: US 8,077,138 B2
(45) Date of Patent: Dec. 13, 2011

(54) ARRANGEMENT COMPRISING A MOBILE TELEPHONE AND AN LCD DISPLAY MODULE

(75) Inventors: Achim Breunig, Seltz (FR); Uwe Nagel, Karlsruhe (DE)

(73) Assignee: Eizo GmbH (DE)

( * ) Notice: Subject to any disclaimer, the term of this patent is extended or adjusted under 35 U.S.C. 154(b) by 663 days.

(21) Appl. No.: 11/918,305

(22) PCT Filed: Apr. 10, 2006

(86) PCT No.: PCT/EP2006/061471
§ 371 (c)(1),
(2), (4) Date: Dec. 18, 2008

(87) PCT Pub. No.: WO2006/108822
PCT Pub. Date: Oct. 19, 2006

(65) Prior Publication Data
US 2009/0167669 A1    Jul. 2, 2009

(30) Foreign Application Priority Data
Apr. 11, 2005   (DE) .......................... 10 2005 016 569

(51) Int. Cl.
*G09G 3/36*   (2006.01)

(52) U.S. Cl. ............................ 345/102; 345/207; 345/89
(58) Field of Classification Search .................. 345/102, 345/89, 87, 204, 690, 207; 455/557, 556.1, 455/566; 348/180, 184–186
See application file for complete search history.

(56) References Cited

U.S. PATENT DOCUMENTS

| 5,440,339 | A | 8/1995 | Harrison et al. |
| 2002/0036646 | A1 | 3/2002 | Tobiya |
| 2002/0186676 | A1 * | 12/2002 | Milley et al. .................. 370/341 |
| 2005/0068291 | A1 | 3/2005 | Coley et al. |

FOREIGN PATENT DOCUMENTS

| JP | 2002-236464 | 8/2002 |
| JP | 2004 096698 A | 3/2004 |

OTHER PUBLICATIONS

English translation of Japanese Office Action dated Apr. 12, 2011.

* cited by examiner

*Primary Examiner* — Stephen Sherman
(74) *Attorney, Agent, or Firm* — Ostrolenk Faber LLP

(57) ABSTRACT

In certain medical systems, such as modalities, it is not desirable to install a program for adjusting an image reproduction characteristic curve with respect to a reference characteristic curve. An arrangement which comprises a mobile telephone, an LCD display module and a look-up table to facilitate said adjustment is provided.

9 Claims, 5 Drawing Sheets

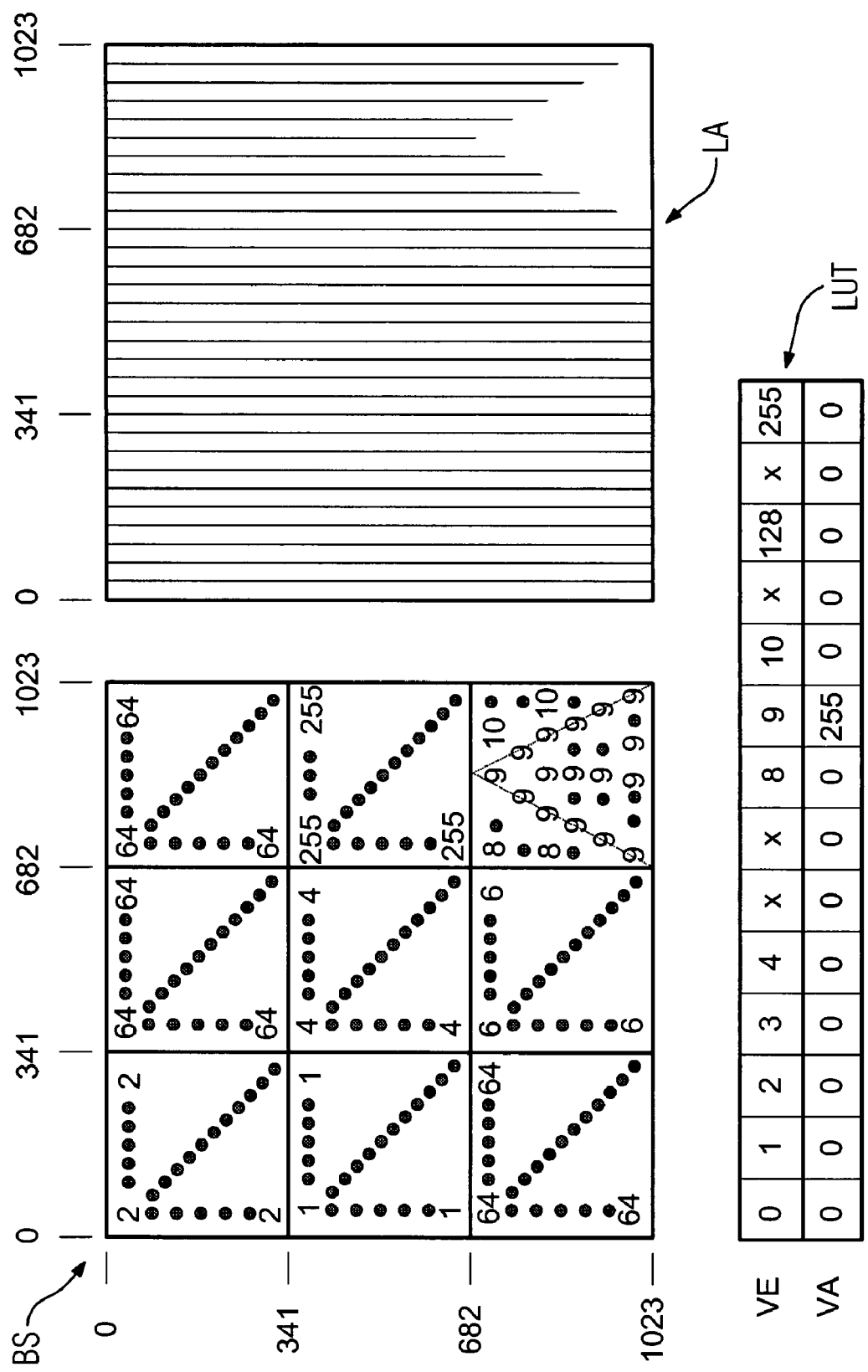

ARRANGEMENT COMPRISING A MOBILE TELEPHONE AND AN LCD DISPLAY MODULE

CROSS REFERENCE TO RELATED APPLICATIONS

This application is the US National Stage of International Application No. PCT/EP2006/061471, filed Apr. 10, 2006 and claims the benefit thereof. The International Application claims the benefits of German application No. 102005016569.9 DE filed Apr. 11, 2005, both of the applications are incorporated by reference herein in their entirety.

FIELD OF INVENTION

The invention relates to an arrangement comprising a mobile telephone and an LCD display module which has an LCD display and a look-up table by means of which the luminance characteristic curve of the LCD display is adjusted to a reference luminance characteristic curve during a calibration phase, wherein a calibration program computes video output values for storing in the look-up table from luminances which a measuring device records in the case of predefinable video input values, and from reference luminances.

BACKGROUND OF INVENTION

In the field of medicine in particular, the demands on an imaging system in terms of the image reproduction characteristic of said system, e.g. of a panel of a flat screen, are extremely high. The image reproduction characteristic indicates how an electrical image signal is converted into an optical signal, consisting of luminance and chrominance. It is desirable, for example, that the luminance increases in a perceptually equidistant manner as a function of a video input signal (a video level). Perceptually equidistant means that the human eye perceives the image e.g. at a video level of 50% of its maximum value as half as bright as the image at a 100% video level. In order to achieve this, measures are necessary to adjust the shape of a luminance characteristic curve to the sensitivity of the human eye.

SUMMARY OF INVENTION

The luminance characteristic curve can be adjusted with the aid of what is known as a look-up table. The correction is effected in that a graphics processor which is suitable for controlling a panel of a flat screen initially writes video input values and video output values assigned to said video input values into a look-up table. The video output value which is then applied to the panel is dependent on the video input value, as a result of which a luminance can be set according to a desired luminance characteristic curve. In other words, the correction is performed such that the digitized image is evaluated with the look-up table; instead of a video input value, a video output value assigned to said video input value is written into the panel.

By this means it is possible to adjust the image reproduction characteristic by way of the look-up table in such a way that said characteristic conforms for example to the DICOM standard. According to said standard the luminance range from 0.05 cd/m$^2$ to 4000 cd/m$^2$ is subdivided into 1024 steps (Just Noticeable Differences) such that the human eye is still just able to perceive the difference in luminance between the individual steps. As a result the luminance increases in a perceptually uniform manner.

In order to calibrate the luminance characteristic curve e.g. in accordance with said DICOM standard, a multiplicity of test images is required, each of which represents a test pattern. For example, approx. 33 grayscales need to be calibrated for the foreground and approx. 50 grayscales for the background, with a suitable measuring head recording the luminances during said calibration. A suitable calibration program that is executable on a personal computer computes video output values from the video input values, the recorded luminances and the reference luminances according to DICOM and stores these in the look-up table.

In certain medical systems (e.g. modalities) it is not desirable to install the calibration program in said systems in order to calibrate the image reproduction characteristic locally. For this reason a calibration of said kind is usually carried out in the course of a factory setting procedure. Furthermore, sufficient memory capacity is needed due to the large number of test images that are required for a calibration, as a result of which not all the necessary test images can be stored in an FPGA device or in an image memory of the LCD display module.

The object of the present invention is to provide an arrangement of the type cited in the introduction by means of which an adjustment of the luminance characteristic curve to a reference luminance characteristic curve is made easier.

This object is achieved by the measures specified in the claims.

It is advantageous that the LCD display module can be calibrated on site, e.g. in a medical area, without a computer being necessary for this. The calibration program is executable on the mobile telephone, with the necessary calibration data being transferred wirelessly between mobile telephone and LCD display module. Toward that end, the mobile telephone and the LCD display module are embodied in each case with a communications interface in the form of a Bluetooth interface.

In one embodiment of the invention a large number of test patterns can be generated for calibration processes or for checking the image quality. For this purpose only one coded test image is required in order to generate a plurality of individual test patterns, i.e. a plurality of individual decoded test images which can be displayed on a panel, with said test patterns being decodable by means of a look-up table that is generally present in LCD display modules. Typically a look-up table has 256 correction points, by means of which e.g. 256 graphical elements can be addressed. Assuming said look-up table has an 8-bit resolution, each element can be displayed in 256 grayscales and/or, in the case of a color display module, in $2^{24}$ colors.

In a further embodiment of the invention, it is provided that the mobile telephone generates the at least one control instruction in accordance with a user input or automatically. This simplifies the calibration on site, whereby a service engineer is able to call up special test patterns or to activate the calibration program which calls up different test patterns required for the calibration in turn.

Further advantageous embodiments of the invention will emerge from the additional dependent claims.

BRIEF DESCRIPTION OF THE DRAWINGS

The invention, its embodiments and advantages thereof are explained in more detail below with reference to the drawing in which an exemplary embodiment of the invention is illustrated.

The figures show:

FIGS. 3 to 5 various test patterns which can be displayed on an LCD display.

DETAILED DESCRIPTION OF INVENTION

Figure 1:
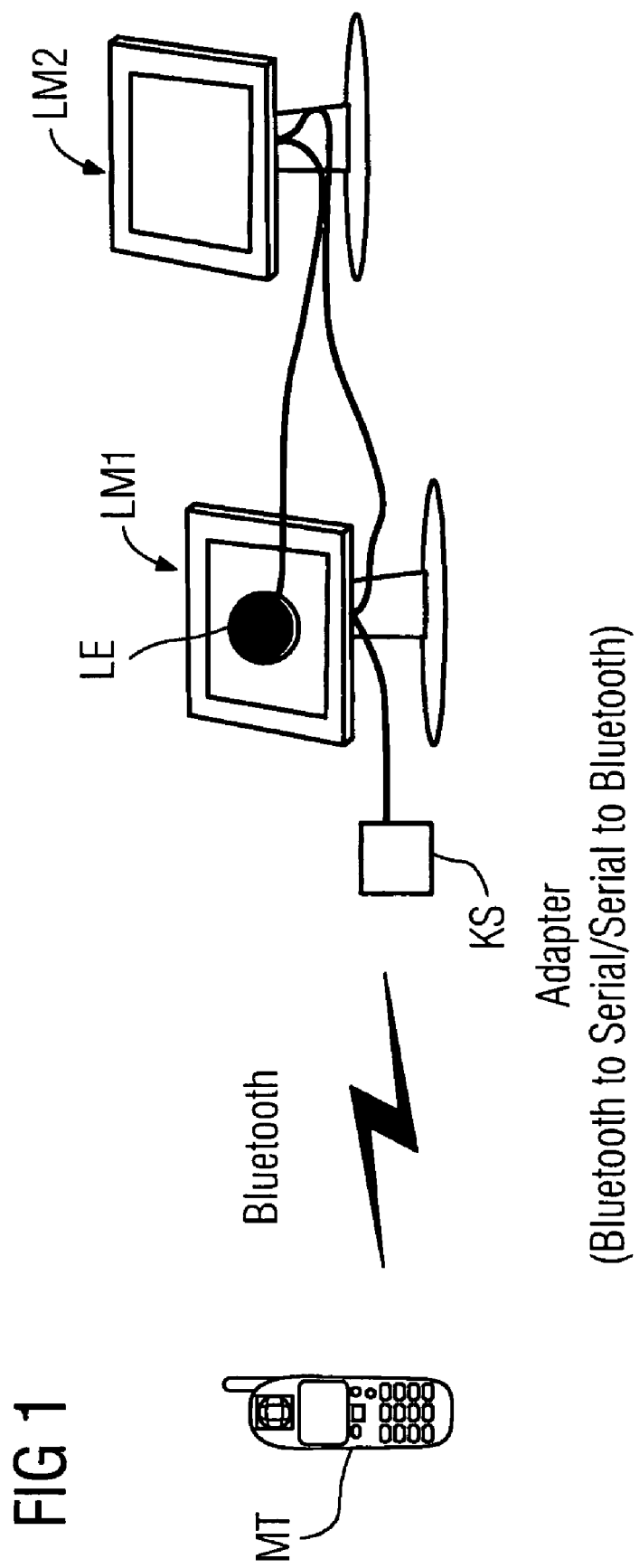
FIG. 1 an arrangement comprising a mobile telephone and LCD display modules.

In FIG. 1 the reference symbol MT designates a mobile telephone which has a memory (not shown here) in which a calibration program is stored which executes on the mobile telephone MT during a calibration phase. During said calibration phase a luminance recording device LE records the luminance of an LCD display of an LCD display module LM1, the recorded luminances being transmitted wirelessly to the mobile telephone MT via a communications interface KS. During this calibration a plurality of test patterns (decoded test images) are displayed on the LCD display, said test patterns being generated—as will be shown below—from a coded test image. The communications interface KS processes the luminance values supplied to it serially by the luminance recording device LE in an appropriate manner in order to transfer them to the mobile telephone MT via a Bluetooth interface. A controller of the mobile telephone MT which is provided for processing the calibration program computes video output values for loading into a look-up table of the LCD display module LM1 from the recorded luminances and the reference luminances stored in the mobile telephone MT. The mobile telephone MT transmits the computed video output values via its Bluetooth interface to the communications interface KS, which supplies the video output values serially to the LCD display module LM1. The LCD display module LM1 has a suitable controller which enters the video output values in the look-up table. In order to be able to calibrate a further LCD display module LM2 after the calibration process, the communications interface KS is also connected to said LCD display module LM2, whereby the luminance recording device LE is disposed on the LCD display of the LCD display module LM2 for the purpose of its calibration.

Figure 2:
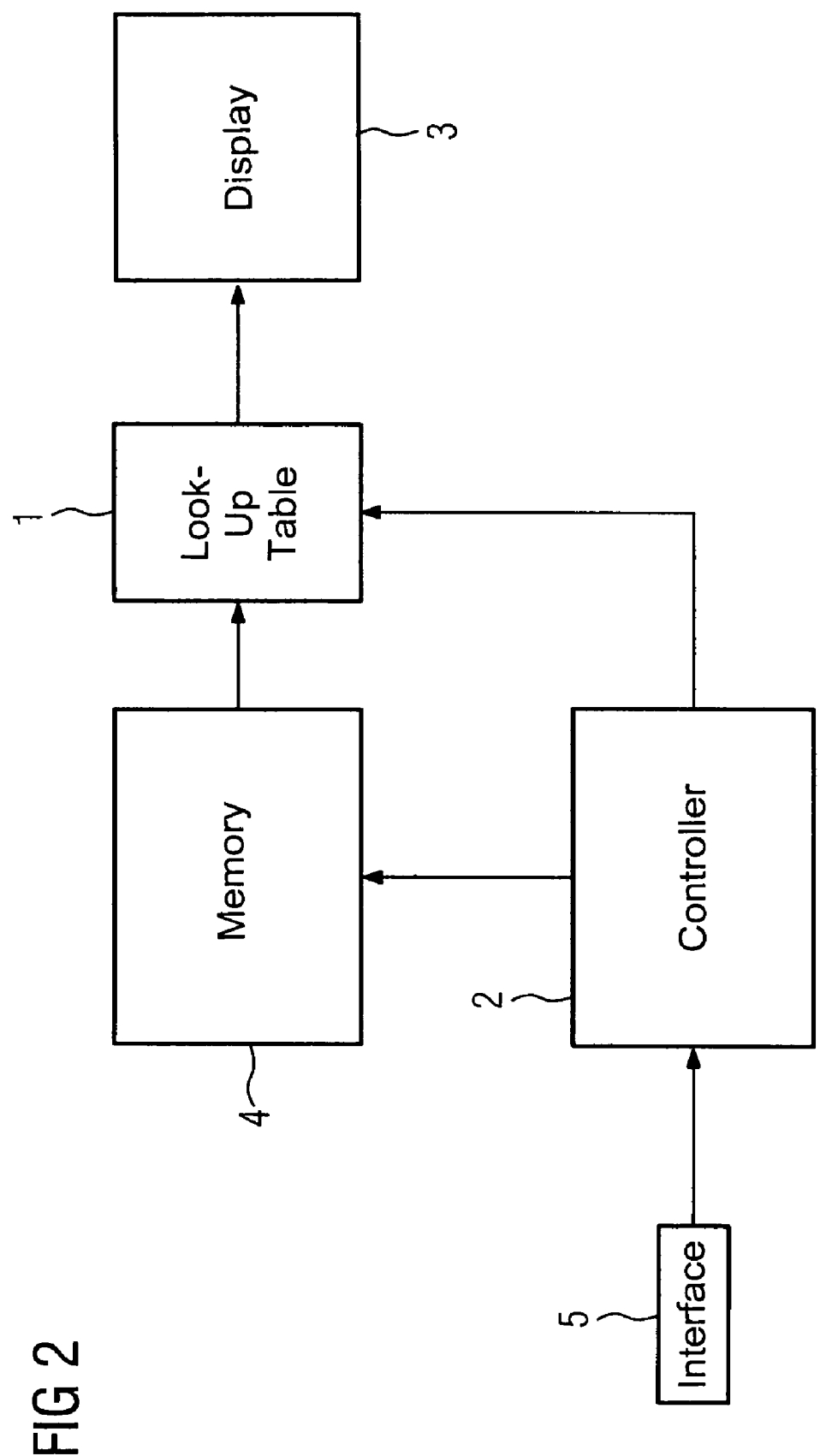
FIG. 2 an arrangement for controlling an LCD display.

Reference is made in the following to FIG. 2, in which an arrangement for controlling an LCD display of an LCD display module is depicted. In the figure, the reference numeral 1 designates a look-up table to which video input steps of a controller 2 can be supplied. The controller 2 can be a component of a graphics processor to which image signals are transmitted during a normal mode of operation. The image signals are processed by the graphics processor, the latter transmitting the processed signals in the form of video input steps to the look-up table 1. The look-up table 1 evaluates the video input steps for the purpose of optimizing the image reproduction characteristic and applies video output steps assigned to the video input steps to an LCD display 3.

In order to generate a plurality of test patterns (decoded test images) from a coded test image for calibration processes during a calibration phase, there is provided in the present exemplary embodiment a memory 4 in which the coded test image can be stored, with a mobile telephone entering the test image into the memory 4 via a suitable communications interface 5. The memory 4, the controller 2 as well as the look-up table 1 and the LCD display 3 are components of an LCD display module. The transfer of the test image is indicated to the controller 2 by means of a control instruction transmitted via the communications interface 5.

It is, of course, possible to transfer the test image initially to the controller 2, which writes the test image into the memory 4.

It is also possible to store the coded test image in, for example, an EEPROM of the arrangement, as a result of which it is not necessary to transmit the test image to the arrangement, thereby shortening the calibration process. Furthermore it is conceivable to store not the complete test image in an EEPROM but only such data as is needed in order to generate the test image. In this case the memory requirement in the arrangement is reduced, whereby in order to generate the test image of the arrangement only an instruction for generating the test image is transmitted via the communications interface 5 and a suitable program in the controller 2 generates the test image.

Prompted by a menu, a user selects a test pattern via a selection program that is executable on the personal computer, by means of which test pattern the selection program generates a further control instruction and transmits it to the controller 2 via the communications interface 5. Based on said control instruction, the controller 2 loads the look-up table 1 with video output values with which a test pattern of the test image—as will be shown below—is decoded. The test patterns can also be selected automatically, whereby in this case calibration software selects and displays different test patterns e.g. in turn on the LCD display 3. The luminances of the test patterns are recorded and evaluated for the purpose of optimizing the image reproduction characteristic or for checking the image quality.

Figure 3:
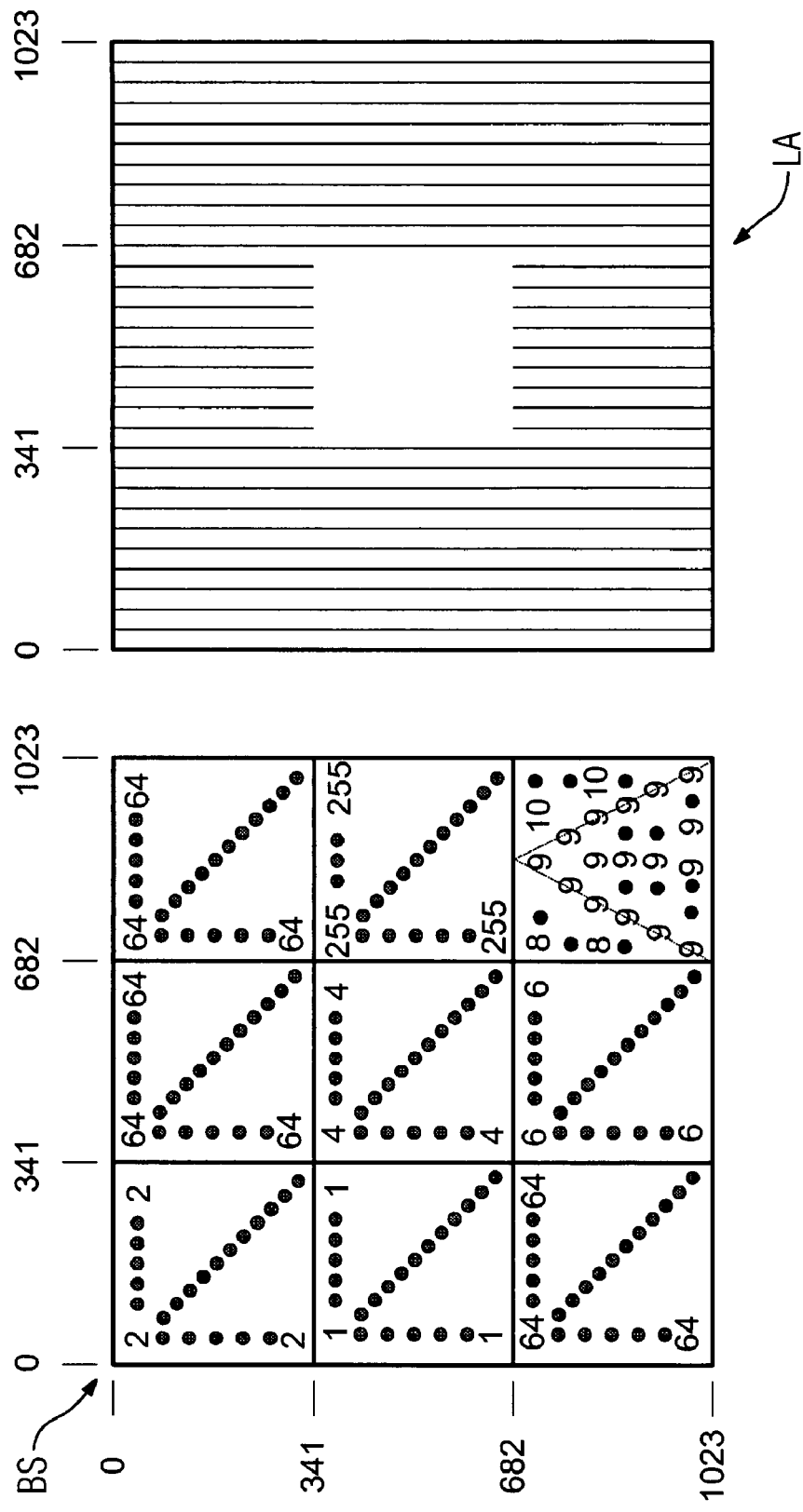
Figure 4:
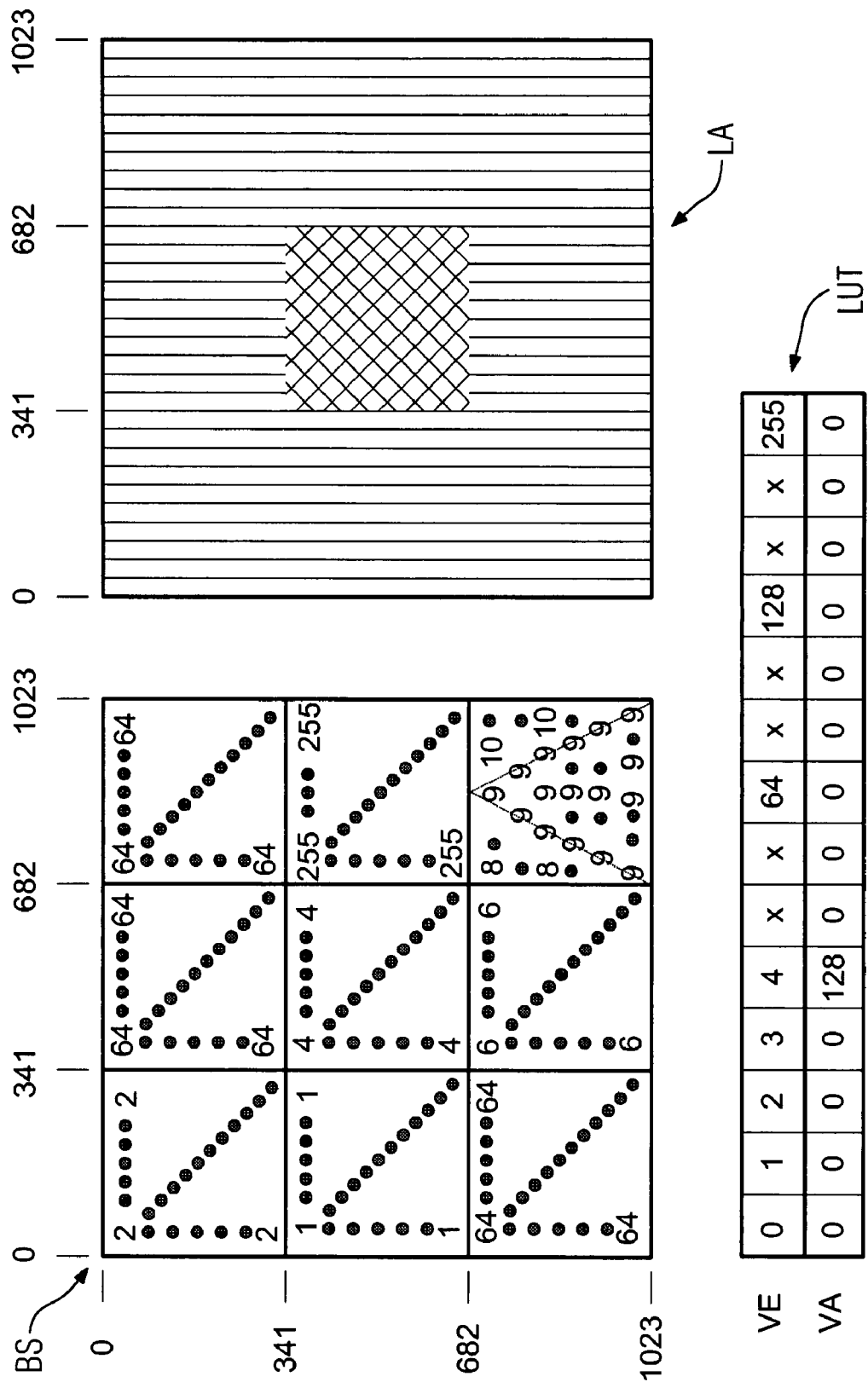

Reference is made in the following to FIGS. 3 to 5 in which different test patterns which can be displayed on an LCD display are shown.

It is assumed that a coded test image stored in an image memory BS can be displayed on a monochrome LCD display with a resolution of 1024×1024 pixels. It is also assumed for the sake of simplicity that an 8-bit look-up table LUT is provided for evaluating the video input steps, as a result of which 256 graphical elements, e.g. elements in the form of a square, a triangle or a circle, can be arranged in the test image and displayed in any grayscale or color. For the sake of simplicity, only one coded monochrome test image is stored in the image memory BS in the present example. In the event that an element is to be displayed in color, a video output value must be provided for each R, G and B primary color for each video input value.

Referring to FIG. 3, video output values VA are assigned to video input values VE in a look-up table LUT loaded by the controller 2. The video output value 255 is assigned to the video input value 4, while the video output value 0 is assigned to each of the remaining video input values. This means that the memory contents of the image memory BS coded with the value 4 will be displayed white on an LCD display LA (pixel range from 341 to 682). Conversely, the memory contents of the image memory BS which are not coded with the value 4 will be displayed black on the LCD display LA (remaining range), which is represented in the figures by vertical lines.

In the example according to FIG. 4, the video input value 4 is again stored in the memory cells which correspond to the pixels 341 to 682 of the LCD display LA (same coded test image). According to the assignment of the look-up table LUT, the video output value 128 is assigned to this video input value, as a result of which a test pattern in the form of a gray square (shown hatched) is displayed in the range of pixels from 341 to 682, with the remaining pixel range of the LCD display LA being displayed black.

Based on the assignment of the image memory BS and the look-up table LUT according to FIG. 5, in which the video output value 255 is assigned to the video input value 9 and the video output value 0 is assigned to the remaining video input values, a white triangle is decoded as a test pattern in the test image in a pixel range from 682 to 1023 and displayed on the LCD display LA, with the remaining pixel range of the LCD display LA again being shown black.

The invention claimed is:

1. An arrangement, comprising:
    an LCD display module comprising a wireless communication interface, an LCD display and a look-up table via which a luminance characteristic curve of the LCD display is adjusted to a reference luminance characteristic curve during a calibration phase; and
    a mobile telephone comprising a wireless communication interface and a processor for executing a calibration program,
    wherein the LCD display module transmits recorded luminances to the mobile telephone via its wireless communication interface, the mobile telephone uses the luminances to compute video output values via the calibration program, the mobile telephone transmits the computed video output values to the LCD display module via the wireless communication interface of the LCD display module to be loaded in the look-up table, wherein recorded luminances are directly transmitted to the mobile telephone.

2. The arrangement as claimed in claim 1, wherein the LCD display module further comprises:
    a test image stored or generated via the LCD display module; and wherein
    a controller to which at least one control instruction is supplied during a calibration phase,
    the at least one control instruction causes the controller to load the look-up table with video output values for the purpose of selecting test patterns from the test image.

3. The arrangement as claimed in claim 2, wherein the mobile telephone generates the at least one control instruction in accordance with a user input.

4. The arrangement as claimed in claim 3, wherein the mobile telephone generates a further control instruction for loading the test image into the LCD display module in accordance with a user input.

5. The arrangement as claimed in claim 3, wherein a further control instruction is generated by actuation of at least one key of the LCD display module or by an activation of an OSD function of the LCD display module.

6. The arrangement as claimed in claim 2, wherein the mobile telephone generates the at least one control instruction automatically.

7. The arrangement as claimed in claim 6, wherein the mobile telephone generates a further control instruction for loading the test image into the LCD display module in accordance with a user input.

8. The arrangement as claimed in claim 6, wherein a further control instruction is generated by actuation of at least one key of the LCD display module or by an activation of an OSD function of the LCD display module.

9. A method for an on site calibration of a medical device having a LCD display module, comprising:
    transmitting recorded luminances via a wireless communication interface of the medical device to a wireless communication interface of a mobile telephone;
    computing video output values using the transmitted luminances at the mobile telephone; and
    transmitting the video output values from the mobile telephone to the wireless communication interface of the medical device; and
    loading the transmitted video output values into a look-up table in the LCD display module for selecting a test pattern from a test image,
    wherein the test image is stored or generated via the LCD display module,
    whereby the LCD display module is calibrated on site of the medical device.

* * * * *